(12) United States Patent
Rose et al.

(10) Patent No.: US 10,625,326 B2
(45) Date of Patent: Apr. 21, 2020

(54) TUBULAR STEEL PRODUCT

(71) Applicant: Benteler Steel/Tube GmbH, Paderborn (DE)

(72) Inventors: Leonhard Rose, Borchen (DE); Jerry Mfosolem Konneh, Höxter (DE); Dirk Tegethoff, Salzkotten (DE)

(73) Assignee: Benteler Steel/Tube GmbH, Panderborn (DE)

( * ) Notice: Subject to any disclaimer, the term of this patent is extended or adjusted under 35 U.S.C. 154(b) by 158 days.

(21) Appl. No.: 15/800,839

(22) Filed: Nov. 1, 2017

(65) Prior Publication Data
US 2018/0117659 A1    May 3, 2018

(30) Foreign Application Priority Data
Nov. 2, 2016 (DE) .................. 10 2016 120 901

(51) Int. Cl.
| | | |
|---|---|---|
| *F16L 9/00* | (2006.01) | |
| *B21D 28/28* | (2006.01) | |
| *B60R 21/00* | (2006.01) | |
| *F16L 9/02* | (2006.01) | |
| *F16L 55/11* | (2006.01) | |
| *B21D 35/00* | (2006.01) | |
| *B21D 51/16* | (2006.01) | |

(52) U.S. Cl.
CPC .............. *B21D 28/28* (2013.01); *B60R 21/00* (2013.01); *F16L 9/02* (2013.01); *F16L 55/1116* (2013.01); *B21D 35/005* (2013.01); *B21D 51/16* (2013.01)

(58) Field of Classification Search
CPC ......... F16L 9/02; F16L 55/1116; B21D 28/28; B21D 35/005; B21D 51/16

USPC .................... 138/92, 94, 177, 178
See application file for complete search history.

(56) References Cited

U.S. PATENT DOCUMENTS

| | | | | |
|---|---|---|---|---|
| 2,133,917 | A * | 10/1938 | Clifton .................. | B23K 5/006 138/92 |
| 4,858,652 | A * | 8/1989 | Bobichon ............... | G01N 23/02 138/92 |
| 4,989,482 | A * | 2/1991 | Mason .................. | B21D 28/18 72/55 |
| 5,460,026 | A * | 10/1995 | Schafer ................. | B21D 28/28 72/55 |
| 5,666,840 | A * | 9/1997 | Shah ..................... | B21D 28/28 72/336 |
| 5,718,145 | A * | 2/1998 | Grabbe ................ | B21D 22/00 72/347 |
| 5,799,524 | A | 9/1998 | Schäfer et al. | |
| 6,511,232 | B1 * | 1/2003 | Ishii ...................... | B21D 28/28 264/156 |

(Continued)

FOREIGN PATENT DOCUMENTS

| | | |
|---|---|---|
| DE | 27 08 749 | 9/1978 |
| DE | 195 30 055 | 2/1997 |

(Continued)

*Primary Examiner* — James F Hook
(74) *Attorney, Agent, or Firm* — Henry M. Feiereisen LLC

(57) ABSTRACT

A tubular product includes a tubular body made of steel and having a tube wall which includes an opening. The opening is produced by a high-speed stamping process at a stamping speed of more than 4 m/s. The opening is situated in the tube wall in a region thereof which has a tensile strength Rm>800 MPa.

18 Claims, 2 Drawing Sheets

(56) References Cited

U.S. PATENT DOCUMENTS

| | | | |
|---|---|---|---|
| 6,658,908 B1* | 12/2003 | Ghiran | B21D 26/035 |
| | | | 72/55 |
| 9,630,230 B2* | 4/2017 | Plau | B21D 22/105 |
| 9,669,449 B2 | 6/2017 | Rixen et al. | |
| 2005/0016237 A1* | 1/2005 | Griskiewitz | B21D 26/035 |
| | | | 72/55 |
| 2012/0279871 A1* | 11/2012 | Gotheil-Yelle | C25B 9/00 |
| | | | 205/637 |
| 2013/0220049 A1 | 8/2013 | Werner et al. | |
| 2014/0210194 A1 | 7/2014 | Horn | |
| 2015/0367399 A1* | 12/2015 | Rixen | B21K 1/70 |
| | | | 72/332 |
| 2017/0050609 A1* | 2/2017 | Yamashita | B60R 21/261 |
| 2017/0080894 A1* | 3/2017 | Kobayashi | B60R 21/272 |

FOREIGN PATENT DOCUMENTS

| | | |
|---|---|---|
| DE | 103 17 185 | 11/2004 |
| DE | 10 2010 007 955 | 8/2011 |
| DE | 10 2014 000 698 | 7/2014 |
| DE | 10 2013 001 919 | 8/2014 |

\* cited by examiner

TUBULAR STEEL PRODUCT

CROSS-REFERENCES TO RELATED APPLICATIONS

This application claims the priority of German Patent Application, Serial No. 10 2016 120 901.5, filed Nov. 2, 2016, pursuant to 35 U.S.C. 119 (a)-(d), the disclosure of which is incorporated herein by reference in its entirety as if fully set forth herein.

BACKGROUND OF THE INVENTION

The present invention relates to a tubular steel product, a method of making such a tubular product, and to a gas generator housing based on such a tubular product.

The following discussion of related art is provided to assist the reader in understanding the advantages of the invention, and is not to be construed as an admission that this related art is prior art to this invention.

Openings can be formed in a tube wall of a tubular product through a drilling process. A downside of this approach is that the drilling process causes contamination, requires additional steps to remove burrs, and adds costs for checking the finished product. Another approach to form openings in a tube wall of a tubular product involves shear cutting. A downside of shear cutting of tubes of high-strength steel is the formation of microcracks around the hole. Tests have shown that most of those microcracks have a length of more than 50 μm. In addition, this approach results in burr formation with burr lengths of more than 40 μm. The extent of burr formation depends greatly on material properties, cutting speed, and cutting geometry.

Moreover, the finished opening becomes considerably wider in the fracture area. Typically the encountered widening of the opening amounts to more than 10% of the wall thickness.

Shear cutting has also the additional effect of increased strain hardening, causing hardening of more than 15% of the base hardness in the cutting area and fracture area. Tests have also shown an edge hardening up to a depth of about 100 μm.

There are applications, in particular when gas generators for airbag systems are involved, that are subject to an extreme pressure rise, e.g. when the airbag is deployed. When the rate of the pressure increase is very high, imperfections are caused in the microstructure, e.g. in the edge region of openings, and can lead to failure of the gas generator housing. The opening in the edge region of gas generator housings is hereby used to charge the gas generator. Subsequently, the opening is sealed by a plug using a welding process.

When the pressure rises at such rates, microcracks in the walls around the openings or changes in the microstructure, such as e.g. increase in hardness or strain hardening in the edge region of the opening, can induce stress peaks that may cause failure of the gas generator housing.

It would therefore be desirable and advantageous to address prior art problems and to obviate other prior art shortcomings.

SUMMARY OF THE INVENTION

According to one aspect of the present invention, a tubular product includes a tubular body made of steel and having a tube wall which includes an opening, the opening being produced by a high-speed stamping process at a stamping speed of more than 4 m/s.

High-speed stamping is based on the principle of shear band formation. As a result of the fast operating speed of the punch, the workpiece undergoes a momentary increase in temperature which is limited to a very narrow material region. Thus, strain hardening is not encountered to the extent as experienced during normal shear cutting with low shear rate, i.e. at a shear rate of less than 4 m/s, normally less than 3 m/s. As a strain hardening is not encountered or at least significantly reduced, stress cracking, i.e. the formation of microcracks, is effectively prevented. Heat caused by the separation process is prevented from migrating fast enough into surrounding regions of the workpiece as a result of the very short process times. Thus, the area of the parting line is softer when compared to shear cutting with normal operating speed of less than 3 m/s. As a result, the edge region of the finished opening becomes more ductile, when undergoing high-speed stamping.

Overall, a tubular product in accordance with the present invention has an opening with improved hole contour and insignificant widening in the fracture area. The tubular product has surface and material characteristics which greatly contribute to eliminating the possibility of failure of the structure in the area of the opening.

According to another advantageous feature of the present invention, the high-speed stamping process can be executed at a stamping speed of more than 5 m/s, in particular in a range from 10 to 15 m/s. The penetration depth of the punch can be minimal and can amount to merely 10 to 40% of the wall thickness of the tubular product. Tubular steel products produced in this manner have an edge region which greatly contributes to the benefits as set forth above. The edge region and thus the cutting surfaces of the openings exhibit hardly any microcracks, are right-angled and thus true to size. This applies not only to dimensions in circumferential direction of the opening but also for the edge indentation as well as for the normally encountered burr. The opening has, therefore, along its cutting line minimal edge indentation and little burr formation. The fracture area, in turn, is the result of a ductile fracture as a result of thermal softening.

According to another advantageous feature of the present invention, the opening can be situated in the tube wall in a region thereof which has a tensile strength Rm of greater than 800 MPa, or greater than 900 MPa. Currently preferred is a tensile strength Rm of greater than 1000 MPa. While the tubular product may exhibit the afore-mentioned tensile strength in its entirety, it is, of course, sufficient to provide the region around the opening with this tensile strength.

A tubular product according to the present invention with thus-produced opening is characterized by a minimal formation of microcracks in the region of the edge zone. The edge zone is defined as the region that surrounds the opening and has a thickness of 1 to 25 μm. Part of the edge zone is also a shear band zone, which is immediately adjacent to the parting line and has a thickness of maximum 5 μm. Any microcracks in the edge zone have a length and/or depth of 1 to maximal 30 μm. The number of microcracks with a length and/or depth within this edge zone is less than 5 and in particular less than 4.

A tubular product according to the present invention differs from prior art tubular products by the absence of any microcracks of a length and/or depth of greater than 30 μm. In addition, the depth of any microcracks is limited to the area of the edge zone of 1 to 25 μm. Any microcrack of a depth of 30 μm thus would have to extend in relation to the edge zone at an angle which deviates from 90°. Microcracks that may have formed in the narrow edge zone are still very short, i.e. shorter than 30 μm. Their number is, however, so small that there is no risk of an adverse effect on the material. In any event, a tubular product according to the present invention differs in the region of the opening from any other prior art tubular product of same material by the number and length/depth of the microcracks, by the material properties, and by the dimensional precision of the opening.

Another benefit of a tubular product according to the present invention is its minor tendency for hardening. Advantageously, the hardness is constant in the region of the edge zone with a thickness of 25 μm. According to another advantageous feature of the present invention, the tube wall has a region of 20 μm adjacent to the opening which region is hardened by the high-speed stamping process to a hardness of maximal 15% above an initial hardness of the tube wall before undergoing the high-speed stamping process. Currently preferred is a hardness of maximal 10% above the initial hardness of the tube wall in that region before undergoing the high-speed stamping process. Hardening in the region of the opening is undesired because of the increased risk of microcrack formation as a result of hardened and thus brittle surfaces.

A tubular product according to the present invention is also characterized by the fact that a maximum hardening is considerably less in the area of the opening when compared to openings in prior art tubular products. In addition, any hardening is encountered only in a very narrow edge zone because the deformation zone gets narrower as the stamping speed increases, so that any impact during production decreases with increasing stamping speed. As the stamping speed increases, hardness distribution becomes more even and the increase in hardness becomes less. As a result, the possibility of stress cracking, i.e. formation of microcracks, is significantly reduced in the fracture area of the opening.

The opening of a tubular product according to the present invention is also true to size, when produced by high-speed stamping, compared to prior art tubular products which have openings that have slanted, funnel-shaped contours. Openings produced by high-speed stamping have virtually no widening in longitudinal direction of the tubular body. In addition, any widening in transverse direction is less pronounced and ranges in the order of <5% of the thickness of the tube wall, with the widening of the opening relating to the fracture area. The cutting area typically does not encounter any widening of the opening. As a result of the improved straightness of the hole walls, tolerances can be more easily maintained in the cutting zone of the opening and in the fracture area. Overall, a tubular product according to the present invention with thus-produced opening is true to size in the area of the opening. Widening in the area of the fracture zone is smaller by at least the factor 4 in transverse direction and by at least the factor 3 in longitudinal direction of the tubular body, when the stamping speed ranges between 4.5 and 6.3 m/s commensurate with a stamping energy of 200 Joule to 400 Joule. As a consequence, narrow tolerances can be maintained in the lower fracture area.

In addition, the fracture areas of the openings as produced by high-speed stamping can be distinguished from conventionally produced tube regions by the fact that the surfaces of prior art tubular products exhibit spherical honeycombs and little deformations as a result of a slight ductility. Openings produced by high-speed stamping have stretched honeycombs, which is an indication of a greater ductility. Honeycombs or indentations in the fracture area are not considered microcracks in the present invention. Microcracks are defined as elongated regions that extend across several honeycombs and in particular transversely to the stamping direction.

A tubular product according to the present invention is produced in particular by a brief pressure stroke of the stamping tool. The duration of the pressure stroke is hereby less than 100 μs. Such a momentary pressure stroke causes an extreme temperature rise in a very narrow material zone, so long as the stamping speed is >4 m/s, especially more than 5 m/s. Currently preferred is a stamping speed in a range from 10 to 15 m/s.

Tests on tube samples of quenched and tempered steel with a content of carbon of <0.20 weight-percent and with a tensile strength Rm>900 MPa at varying outer dimensions and wall thicknesses between 18-35 mm×1.7-2.5 mm (outer diameter×wall thickness) have shown that the microcrack length could be decreased in all test samples from a maximum of 140 μm to less than 30 μm. In addition, the number of microcracks could be reduced. Also the burr length has been decreased from 60 μm to 30 μm.

The thickness of the hardened regions has been reduced from a maximum of 140 μm to maximal 25 μm. The opening exhibits a fracture area, with the diameter of the opening at the exit of the fracture area, i.e. on the side distal to the stamping tool, being reduced from about 15% to 8% of the wall thickness. Hardening in the perforated region has been reduced from a maximum of 20% of the base hardness to maximal 8% of the base hardness.

According to another advantageous feature of the present invention, a plug can be welded in a pressure-tight manner to one side of the opening to seal the opening. The plug can be welded from radially outside into the opening. Welding heat affects the microstructure within a heat impact zone, with the hardening and the microcracks in the heat impact zone being altered or entirely or partly eliminated. The heat impact zone extends advantageously not across the entire wall thickness but ends at a distance to an exit of the opening on a side of the tubular body which side is distal to the welding process. The degree of hardening and any microcracks possibly encountered there are thus not changed.

According to another aspect of the present invention, a method of making a tubular product includes subjecting a tubular body of high-strength steel with a tensile strength of greater than 800 MPa to a high-speed stamping process at a stamping speed of more than 4 m/s is to form in a tube wall of the tubular body at least one opening with closed cutting line.

A tubular product according to the present invention can find application in particular for use as gas generator housing.

According to another aspect of the present invention, a gas generator housing includes a seamless tubular body made of steel and having a tube wall which includes an opening, the opening being produced by a high-speed stamping process at a stamping speed of more than 4 m/s.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
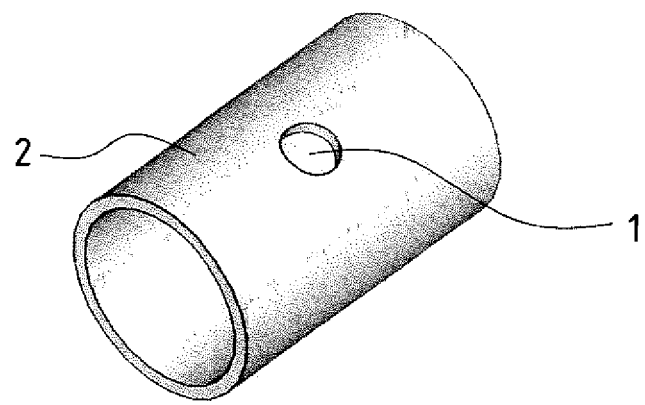
FIG. 1 is a perspective illustration of part of a tubular product according to the present invention, depicting the provision of an opening produced by high-speed stamping.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments may be illustrated by graphic symbols, phantom lines, diagrammatic representations and fragmentary views. In certain instances, details which are not necessary for an understanding of the present invention or which render other details difficult to perceive may have been omitted.

Turning now to the drawing; and in particular to FIG. 1, there is shown a perspective illustration of part of a tubular product according to the present invention. The tubular product may find application in the manufacturing of a gas generator housing and has a tube wall 2 which is formed with an opening 1. The tubular product is circular in cross section and made from a seamless tubular body. The opening 1 is produced by high-speed stamping using a circular stamping tool or punch operated at a stamping speed of more than 4 m/s.

Figure 2:
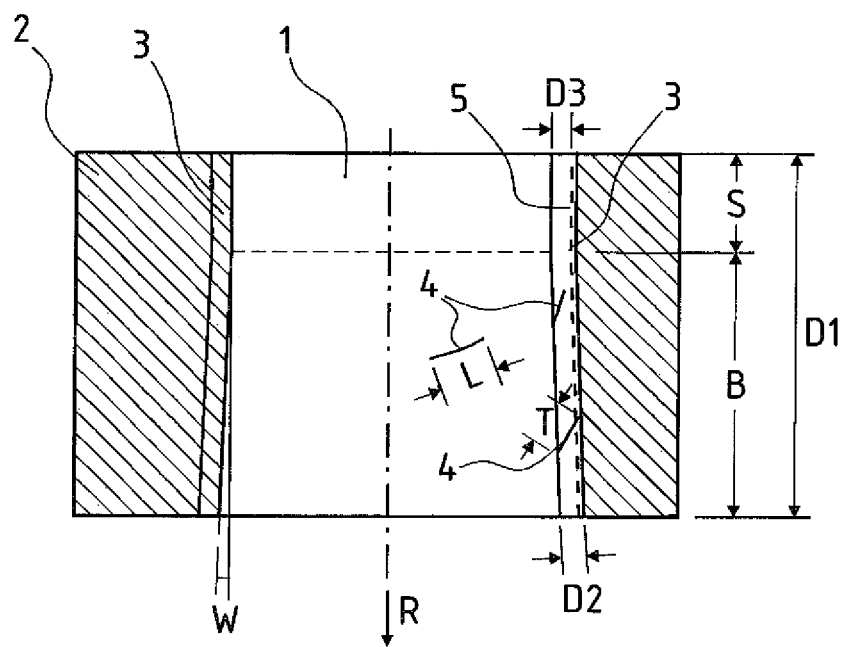
FIG. 2 is a simplified longitudinal section of the tubular product in a region of the opening.

FIG. 2 is a simplified longitudinal section of the tubular product in a region of the opening 1 of the tube wall 2. The tube wall 2 has a thickness D1 which is considerably greater than a thickness D2 of an edge zone 3 of the opening 1. The thickness D1 is in a range of several millimeters, e.g. 2 mm, whereas the thickness D2 of the edge zone 3 is in the range of 1 to 25 μm. For ease of illustration, the thickness D2 of the edge zone 3 is shown in FIG. 2 enlarged. The opening 1 has a cross section which increases from top to bottom as a result of the stamping direction R of the punch. A fracture area B of the opening 1 is located in the drawing plane below, whereas a cutting area S of the opening 1 is located in the drawing plane above. The cutting area S extends across about 15% of the thickness D1 of the tube wall 2 and the fracture area B thus extends across about 85% of the thickness D1 of the tube wall 2. The cutting area S is substantially cylindrical in the non-limiting exemplified embodiment shown here.

Figure 4:
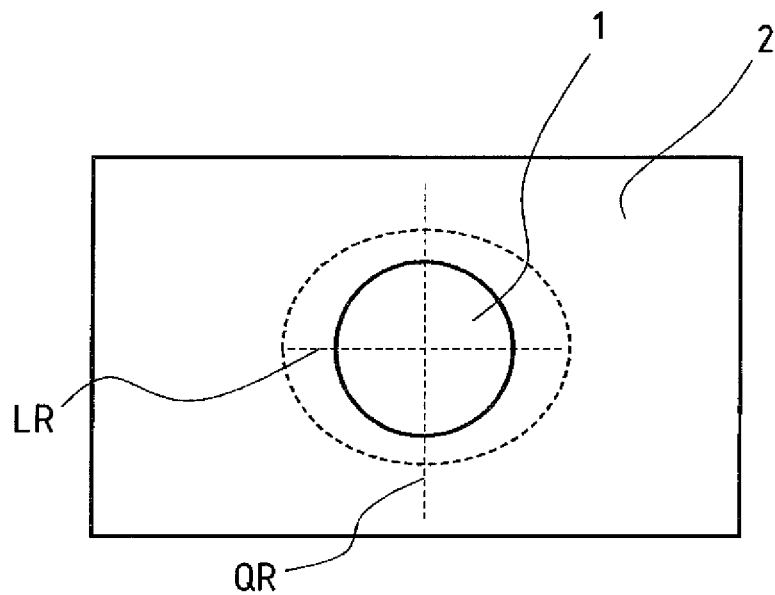
FIG. 4 is a plan view onto the region of the opening.

The wall of the opening 1 extends in the cutting area S substantially parallel to the stamping direction R. The fracture area B is slightly funnel-shaped. This becomes apparent by angle W between the outer surface area of the opening 1 and a vertical to the surface of the tubular product or stamping direction R. The angle W is advantageously less than 8° in transverse direction QR (FIG. 4) of the tubular product and advantageously less than 3° in longitudinal direction LR of the tubular product. Any widening of the opening 1 in the fracture area B is advantageously kept to less than 8% of the thickness D1 of the tube wall 2, in particular to less than 3% of the thickness D1 of the tube wall 2.

FIG. 2 further shows the presence of several small microcracks 4 which are dispersed across the cutting surface of the opening 1. The microcracks 4 have each a length L or depth T of less than 1 to 30 mm. The microcracks 4 originate all from the cutting surface of the opening 1 and extend by a maximum of 30 μm, as viewed in circumferential direction of the opening 1. Also the depth T, measured along the microcrack course in the edge zone 3, is shorter than 30 μm. Experience shows that the microcracks 4 extend at an angle of about 45° in relation to the stamping direction R, with the mouth of the microcracks 4 pointing in the stamping direction R.

A tubular product made of steel and having a tube wall 2 which includes an opening 1 that is produced by high-speed stamping at a stamping speed of more than 4 m/s features only a very small number of microcracks which—if present at all—are short in length L and/or depth T of less than 30 μm.

FIG. 2 shows on the right-hand side in the area of the edge zone 3 a dashed line and a continuous line. The continuous line illustrates the entire edge zone 3 at a thickness D2 of 1 to 25 μm. The narrower region with a thickness D3 illustrates the region of the edge zone 3 in which maximum hardening is at most 15% above the initial hardness of the tube wall 2.

Figure 3:
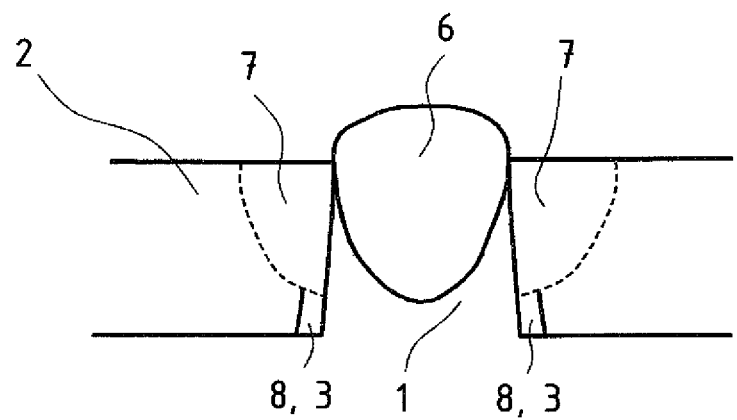
FIG. 3 is an enlarged detailed view of the region of the opening, depicting the placement of a plug in the opening.

FIG. 3 shows an enlarged detailed view of the region of the opening 1 which is welded shut by a plug 6. A heat impact zone 7, created during the welding process is indicated by a broken line. The heat impact zone 7 ends at a distance to a lower exit of the opening 1, as viewed in the drawing plane, and opposes the plug 6. The region whose microstructure remains unaffected by the heat impact as a result of the welding process and therefore is not altered is located adjacent to the lower exit of the opening (unaltered region 3).

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A tubular product, comprising a tubular body made of steel and having a tube wall which includes an opening, said opening being produced by a high-speed stamping process at a stamping speed of more than 4 m/s, wherein the tube wall has a region of 20 μm adjacent to the opening which region is hardened by the high-speed stamping process to a hardness of maximal 15% above an initial hardness of the tube wall before undergoing the high-speed stamping process.

2. The tubular product of claim 1, wherein the opening is situated in the tube wall in a region thereof which has a tensile strength Rm>800 MPa.

3. The tubular product of claim 1, wherein any microcrack formed in the opening is limited to a length and/or depth of maximal 30 μm.

4. The tubular product of claim 1, wherein the region is hardened by the high-speed stamping process to a hardness of maximal 10% above an initial hardness of the tube wall before undergoing the high-speed stamping process.

5. The tubular product of claim 1, wherein the opening has a fracture area and is defined by a diameter which at an exit of the fracture area is less than 8% of a thickness of the tube wall as viewed in a transverse direction of the tubular product.

6. The tubular product of claim 1, wherein the opening has a fracture area and is defined by a diameter which at an exit of the fracture area is less than 3% of a thickness of the tube wall as viewed in a longitudinal direction of the tubular product.

7. The tubular product of claim 1, further comprising a plug welded to one side of the opening to tightly seal the opening.

8. The tubular product of claim 7, wherein any microcrack forming in a region of a heat impact zone as a result of the welding process has material properties involving hardness, length and/or depth which are altered in the heat impact zone, said heat impact zone sized to end at a distance to an exit of the opening on a side of the tubular body which side is distal to the welding process.

9. A method of making a tubular product for use in a gas generator housing, said method comprising subjecting a tubular body of high-strength steel with a tensile strength of greater than 800 MPa to a high-speed stamping process at a stamping speed of more than 4 m/s to form in a tube wall of the tubular body at least one opening with closed cutting line, wherein the tube wall has a region of 20 μm adjacent to the at least one opening which region is hardened by the high-speed stamping process to a hardness of maximal 15% above an initial hardness of the tube wall before undergoing the high-speed stamping process.

10. The method of claim 9, wherein the high-speed stamping process is executed at a stamping speed of more than 5 m/s.

11. The method of claim 9, wherein the high-speed stamping process is executed at a stamping speed in a range of 10 to 15 m/s.

12. A gas generator housing, comprising a seamless tubular body made of steel and having a tube wall which includes an opening, said opening being produced by a high-speed stamping process at a stamping speed of more than 4 m/s, wherein the tube wall has a region of 20 μm adjacent to the opening which region is hardened by the high-speed stamping process to a hardness of maximal 15% above an initial hardness of the tube wall before undergoing the high-speed stamping process.

13. The gas generator housing of claim 12, wherein the opening is situated in the tube wall in a region thereof which has a tensile strength Rm>800 MPa.

14. The gas generator housing of claim 12, wherein any microcrack formed in the opening is limited to a length and/or depth of maximal 30 μm.

15. The gas generator housing of claim 12, wherein the region is hardened by the high-speed stamping process to a hardness of maximal 10% above an initial hardness of the tube wall before undergoing the high-speed stamping process.

16. The gas generator housing of claim 12, wherein the opening has a fracture area and is defined by a diameter which at an exit of the fracture area is less than 8% of a thickness of the tube wail as viewed in a transverse direction of the tubular product.

17. The gas generator housing of claim 12, wherein the opening has a fracture area and is defined by a diameter which at an exit of the fracture area is less than 3% of a thickness of the tube wail as viewed in a longitudinal direction of the tubular product.

18. The gas generator housing of claim 12, further comprising a plug welded to one side of the opening to tightly seal the opening.

* * * * *

UNITED STATES PATENT AND TRADEMARK OFFICE
CERTIFICATE OF CORRECTION

PATENT NO. : 10,625,326 B2
APPLICATION NO. : 15/800839
DATED : April 21, 2020
INVENTOR(S) : Leonhard Rose, Jerry Mfosolem Konneh and Dirk Tegethoff Page 1 of 1

It is certified that error appears in the above-identified patent and that said Letters Patent is hereby corrected as shown below:

In the Claims

In Column 8, Claim 17, Line 28, replace "wail" with --wall--.

Signed and Sealed this
Twenty-first Day of July, 2020

Andrei Iancu
*Director of the United States Patent and Trademark Office*